(12) United States Patent
Moltmann et al.

(10) Patent No.: US 12,330,589 B2
(45) Date of Patent: Jun. 17, 2025

(54) ARRANGING PASSENGER TRIPS FOR AUTONOMOUS VEHICLES

(71) Applicant: Waymo LLC, Mountain View, CA (US)

(72) Inventors: Philip Moltmann, Menlo Park, CA (US); Reed Morse, Millbrae, CA (US); Jason Persampieri, San Mateo, CA (US); Kevin Malta, San Francisco, CA (US); Lauren Schwendimann, Burlingame, CA (US)

( * ) Notice: Subject to any disclaimer, the term of this patent is extended or adjusted under 35 U.S.C. 154(b) by 484 days.

(21) Appl. No.: 17/681,312

(22) Filed: Feb. 25, 2022

(65) Prior Publication Data

US 2023/0271590 A1 Aug. 31, 2023

(51) Int. Cl.
*B60R 25/24* (2013.01)
*B60R 25/30* (2013.01)
*B60W 60/00* (2020.01)
*G06K 7/14* (2006.01)

(52) U.S. Cl.
CPC .......... *B60R 25/241* (2013.01); *B60R 25/305* (2013.01); *B60W 60/00253* (2020.02); *G06K 7/1417* (2013.01); *B60W 2556/45* (2020.02)

(58) Field of Classification Search
CPC .............. B60R 25/241; B60R 25/305; B60W 60/00253; B60W 2556/45; G06K 7/1417
See application file for complete search history.

(56) References Cited

U.S. PATENT DOCUMENTS

| | | | |
|---|---|---|---|
| 2016/0301698 A1* | 10/2016 | Katara | .................. H04L 63/102 |
| 2017/0327082 A1 | 11/2017 | Kamhi et al. | |
| 2020/0010051 A1 | 1/2020 | Dumov | |
| 2020/0082064 A1 | 3/2020 | Kurian | |
| 2020/0150660 A1* | 5/2020 | Kim | ........................ B60R 25/25 |
| 2020/0344602 A1 | 10/2020 | Li | |
| 2021/0254985 A1 | 8/2021 | Outwater et al. | |

OTHER PUBLICATIONS

App Clips, downloaded from the internet on Feb. 16, 2022, url: https://developer.apple.com/app-clips/.
The Extended European Search Report for European Patent Application No. 23158011.9, Jun. 22, 2023, 8 Pages.

* cited by examiner

*Primary Examiner* — Andrew J Cromer
(74) *Attorney, Agent, or Firm* — Botos Churchill IP Law

(57) ABSTRACT

Aspects of the disclosure provide for arranging a trip in an autonomous vehicle without a driver. For instance, a request may be received from a client computing device associated with a first person to arrange the trip for a second person. The request may include a pickup location for the second person and a destination location for the second person. An authentication method may be identified for the trip. A signal may be sent to the autonomous vehicle in order to cause the autonomous vehicle to maneuver to the pickup location, authenticate the second person using the authentication method, and transport the second person to the destination location.

25 Claims, 11 Drawing Sheets

ARRANGING PASSENGER TRIPS FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of arranging a trip in an autonomous vehicle without a driver. The method includes receiving, by one or more processors, a request from a client computing device associated with a first person to arrange the trip for a second person, the request including a pickup location for the second person and a destination location for the second person; identifying, by the one or more processors, an authentication method for the trip; and sending, by the one or more processors, a signal to the autonomous vehicle in order to cause the autonomous vehicle to maneuver to the pickup location, authenticate the second person using the authentication method, and transport the second person to the destination location.

In one example, the method also includes providing the client computing device with first authentication information; receiving second authentication information from the autonomous vehicle; and authenticating the second person using the first authentication information and the second authentication information. In this example, the method also includes, based on the authenticating, sending a signal to the autonomous vehicle to cause the autonomous vehicle to unlock a door of the autonomous vehicle. In addition or alternatively, the method also includes sending a signal to the autonomous vehicle to cause the autonomous vehicle to transport a passenger to the destination location. In addition or alternatively, the first authentication information includes a QR code. In this example, the second authentication information includes an image. In addition or alternatively, the first authentication information includes a passphrase. In this example, the second authentication information includes an audio recording of the passphrase. In another example, the method also includes receiving from the autonomous vehicle an image or video; sending the image or video to the client computing device; in response to sending the image or video to the client computing device, receiving a first signal indicating that the image or video includes the second person; and in response to receiving the first signal, sending a second signal to the autonomous vehicle to cause the autonomous vehicle to unlock a door of the autonomous vehicle. In another example, the method also includes receiving from the autonomous vehicle an image or video; sending the image or video to the client computing device; in response to sending the image or video to the client computing device, receiving a first signal indicating that the image or video includes the second person; and in response to receiving the first signal, sending a second signal to the autonomous vehicle to cause the autonomous vehicle to transport a passenger to the destination location. In another example, identifying the authentication method includes selecting from a plurality of authentication methods based on a type of the pickup location. In another example, identifying the authentication method includes identifying a last authentication method selected by the first person when scheduling a trip for another person. In another example, identifying the authentication method includes receiving a signal from the client computing device indicating that the second person will not be authenticating using a cell phone. In another example, identifying the authentication method includes providing a plurality of authentication methods to the client computing device and in response to providing the plurality of authentication methods, receiving a signal from the client computing device a signal identifying one of the plurality of authentication methods, wherein the identified one of the authentication methods is the authentication method. In another example, the method also includes, sending a link to the client computing device, wherein the link is a link to a secure website which includes an option for unlocking the autonomous vehicle. In another example, the method also includes sending a signal to the autonomous vehicle to cause the autonomous vehicle to limit changes to the destination location during the trip. In another example, the method also includes facilitating a communication link between the autonomous vehicle and the client computing device in order to enable the first person to communicate with the second person during the trip. In another example, the destination location corresponds to a current location of the client computing device, and the method further comprises: receiving an updated location of the client computing device after the second person has been authenticated and providing the autonomous vehicle with updated location such that the autonomous vehicle reroutes itself in order to drop off the second person at the updated location. In another example, the method also includes receiving an image or video after the second person has exited the autonomous vehicle and providing the image or video to the client computing device for display to the first person.

Other aspects of the disclosure provide a system for arranging a trip in an autonomous vehicle without a driver. The system includes one or more server computing devices having one or more processors configured to: receive a request from a client computing device associated with a first person to arrange the trip for a second person, the request including a pickup location for the second person and a destination location for the second person; identify an authentication method for the trip; and send a signal to the autonomous vehicle in order to cause the autonomous vehicle to maneuver to the pickup location, authenticate the second person using the authentication method, and transport the second person to the destination location.

DETAILED DESCRIPTION

Overview

Figure 1:
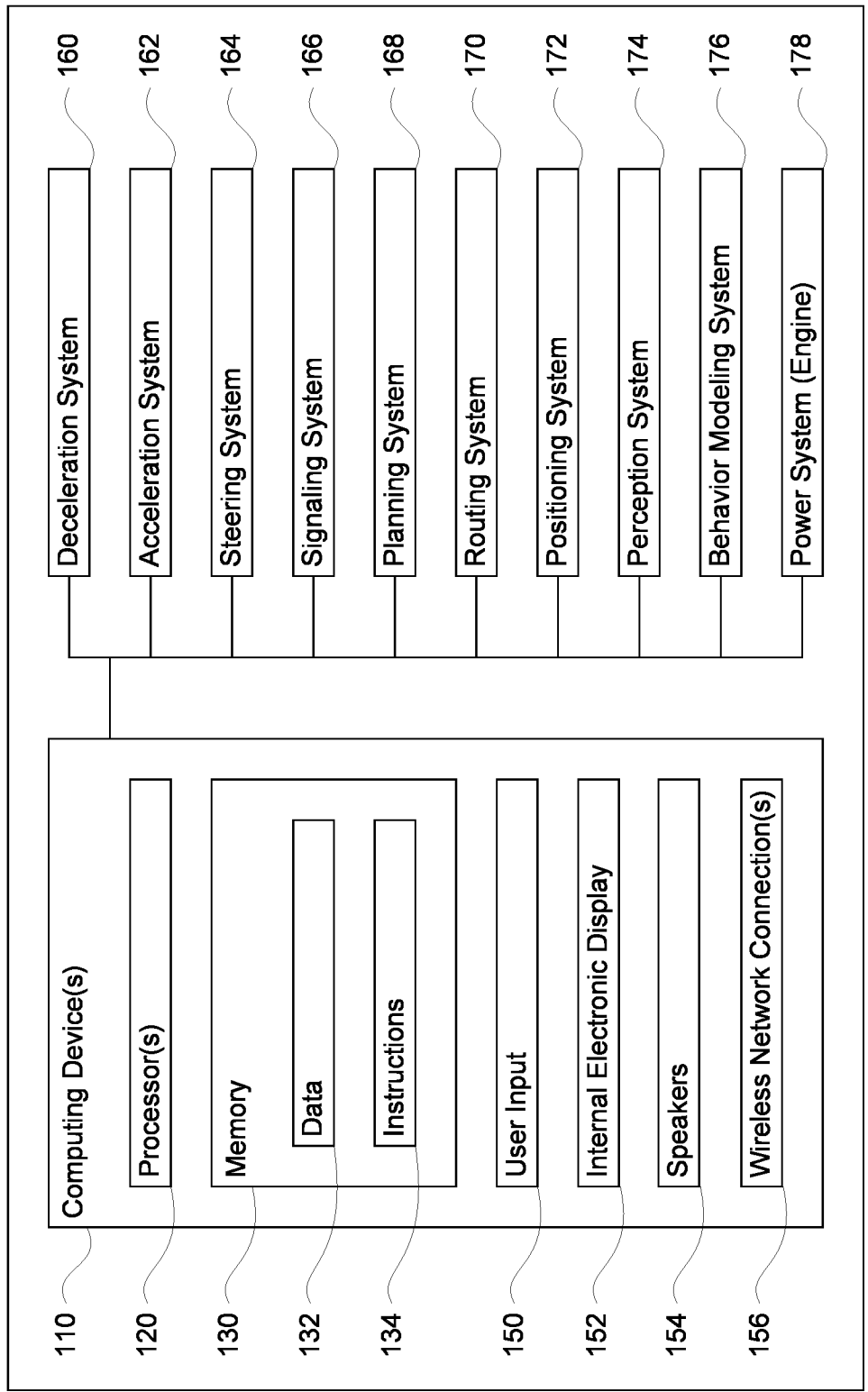
FIG. 1 is a functional diagram of an example vehicle in accordance with an exemplary embodiment.

The technology relates to allowing one person (e.g. a scheduler) of a transportation service to arrange trips for another person (e.g. passenger) utilizing autonomous vehicles which may not have a driver. This may be especially useful for scheduling rides for persons who may not have access to a phone (or other client computing device), may not be considered "tech savvy", or may not otherwise be comfortable or readily capable of arranging a trip themselves. One challenge of enabling such use is the need to authenticate passengers when they arrive at the autonomous vehicle to ensure that such passengers are the passenger assigned to the vehicle, in the correct vehicle and/or are going to be traveling to the correct destination location. While in a typical taxi service such information can be readily confirmed by a driver, for autonomous vehicles, there may not actually be a driver. Moreover, it may be important to ensure such passengers have a comfortable and safe ride in an autonomous vehicle during a trip.

To enable a scheduler to arrange a trip for a passenger, the scheduler may access an application on the scheduler's client computing device. The scheduler may provide both a pickup location as well as a drop off or destination location for the passenger. This information may be sent to one or more server computing devices which may arrange and schedule the trip by selecting and assigning an autonomous vehicle to the trip. In addition, the scheduler's client computing device may also be associated with the trip so that the server computing device is able to communicate additional information about the trip to the scheduler's client computing device as discussed further below.

However, in order to facilitate the aforementioned authentication, different authentication processes may be used. For instance, the authentication process may involve the server computing devices providing the scheduler's client computing device with a passcode, link or other information which the scheduler may then forward to the passenger. This information may then also be provided to the assigned autonomous vehicle.

In some instances, the server computing devices may automatically provide or enable a default authentication method. For instance, the default authentication method may not require the scheduler to provide any information about the passenger to the server computing devices via the application to facilitate the authentication of the passenger. In addition, the default authentication method may not require that the scheduler provide information received from the server computing devices to the passenger to facilitate the authentication of the passenger. By doing so, this may enable the autonomous vehicle to authenticate the passenger even though the passenger may not necessarily have a cell phone, the aforementioned application or an account with the transportation service.

The server computing devices may also send information to the autonomous vehicle indicating what type of authentication method will be used when picking up the passenger, and if needed, passenger authentication information if the authentication process is to occur at the autonomous vehicle. Alternatively, no passenger authentication information need be sent to the autonomous vehicle if the authentication process is to occur at the server computing devices.

Once the autonomous vehicle is assigned to the trip, the autonomous vehicle may control itself to the pickup location in order to authenticate and pick up the passenger. Various authentication methods may be used. In some instances, the authentication method may involve the person approaching the autonomous vehicle, and if the person has consented, capturing an image or video of the person. This image or video may be sent to the server computing devices. The server computing devices may then forward the image or video to the scheduler's client computing device for display. At this point, the scheduler may confirm whether or not the person is the correct passenger. Alternatively, the autonomous vehicle may unlock its doors, allow the passenger to open a door and enter the autonomous vehicle, close the door, and thereafter, if the passenger has consented, capture an image or video of the passenger or a photo identification. Again, this image or video may be forwarded to the scheduler's client computing device for display and confirmation of whether or not the person is the correct passenger.

As another alternative, the passenger may need to provide passenger authentication information, such as a passcode, from the server computing devices to the passenger. The passenger may then use or provide the passenger authentication information to the computing devices of the autonomous vehicle for authentication locally at the autonomous vehicle, for example using an in-car touchscreen. Alternatively, the passenger authentication information may be sent to the server computing devices for authentication.

As another alternative, if the passcode includes a link, a person may use the link to access a secure website. The website may include an option to automatically unlock the doors of the autonomous vehicle, for instance, by causing the server computing devices to send a signal to the autonomous vehicle to unlock the doors of the autonomous vehicle. The website may alternatively display a passcode which the person or passenger can enter or display and orient towards a camera of the autonomous vehicle as in the examples above.

During the ride, the passenger may be provided with additional features and functionalities. This may be facilitated by instructions from the server computing devices to the autonomous vehicle at the time the pickup location, destination location, and authentication method are sent to the autonomous vehicle. For instance, when the passenger enters the autonomous vehicle, the autonomous vehicle may send a signal to the server computing devices which may facilitate a call or video conferencing link between the autonomous vehicle and the scheduler's client computing device. In addition, as the server computing devices receive updated information about the location and status of the autonomous vehicle, this information may also be sent to the scheduler's client computing device. In addition, the aforementioned instructions may cause the autonomous vehicle to enable or even disable certain features on an internal display of the autonomous vehicle.

Once the autonomous vehicle has reached its destination location, it may pull over and stop to allow the passenger to exit the autonomous vehicle. In some instances, if the passenger has consented, the autonomous vehicle may capture an image or video of the passenger and send the image or video to the server computing devices. The server computing devices may again provide the scheduler's client computing device with the image or video via the application in order to indicate to the scheduler that the person has reached the final destination location.

The features described herein may allow users (e.g. schedulers) of a transportation service to arrange trips for another person (e.g. passengers) utilizing autonomous vehicles which may not have a driver. This may be especially useful for scheduling rides for persons who may not have access to a phone (or other client computing device), may not be considered "tech savvy", or may not otherwise be comfortable or readily capable of arranging a trip themselves. The features described herein may provide for authenticating of passengers when they arrive at the autonomous vehicle to ensure that such passengers are the passenger assigned to the vehicle, in the correct vehicle and/or are going to be traveling to the correct destination location. In addition, the features described herein may help to ensure such passengers have a comfortable and safe ride in an autonomous vehicle during a trip.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processor, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
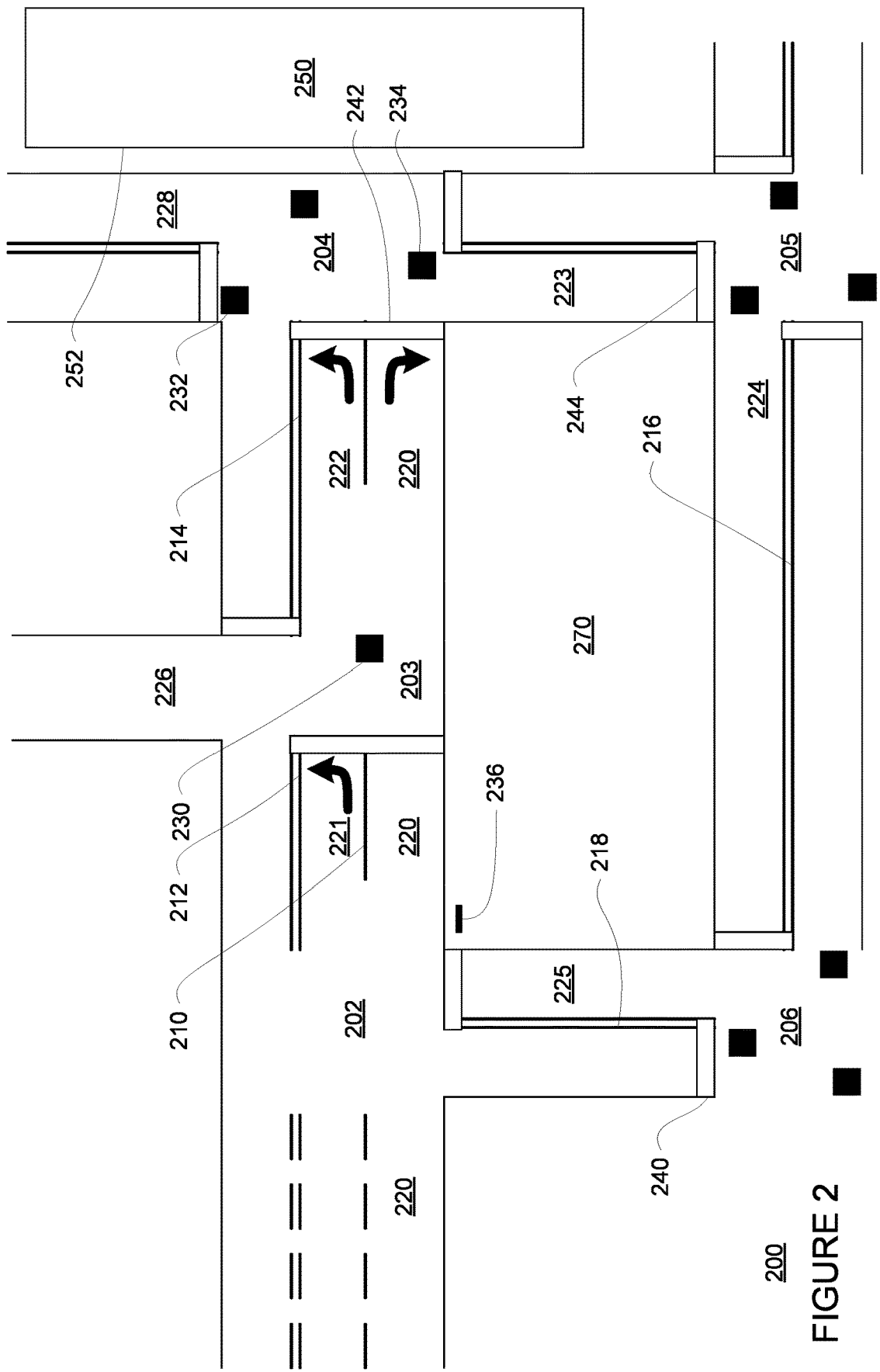
FIG. 2 is an example of map information in accordance with aspects of the disclosure.

FIG. 2 is an example of map information 200 for a small section of roadway including intersections 202, 203, 204, 205, 206. FIG. 2 depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236, stop lines 240, 242, 244, as well as a non-drivable area 270. In this example, lane 221 approaching intersection 204 is a left turn only lane, lane 222 approaching intersection 206 is a left turn only lane, and lane 226 is a one-way street where the direction of traffic moves away from intersection 204. In this example, the map information 200 also identifies a footprint 252 of a building 250. Although shown in two dimensions, the footprint may also be a three-dimensional area occupied by the building. This may also be associated with additional information identifying a classification or type of the building and/or a number of stories, floors or levels. For example, building 250 may be a retail business with two stories. In addition to the aforementioned features and information, the map information may also include information that identifies the direction of traffic for each lane as well as information that allows the computing devices 110 to determine whether the vehicle has the right of way to complete a particular maneuver (i.e. complete a turn or cross a lane of traffic or intersection).

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
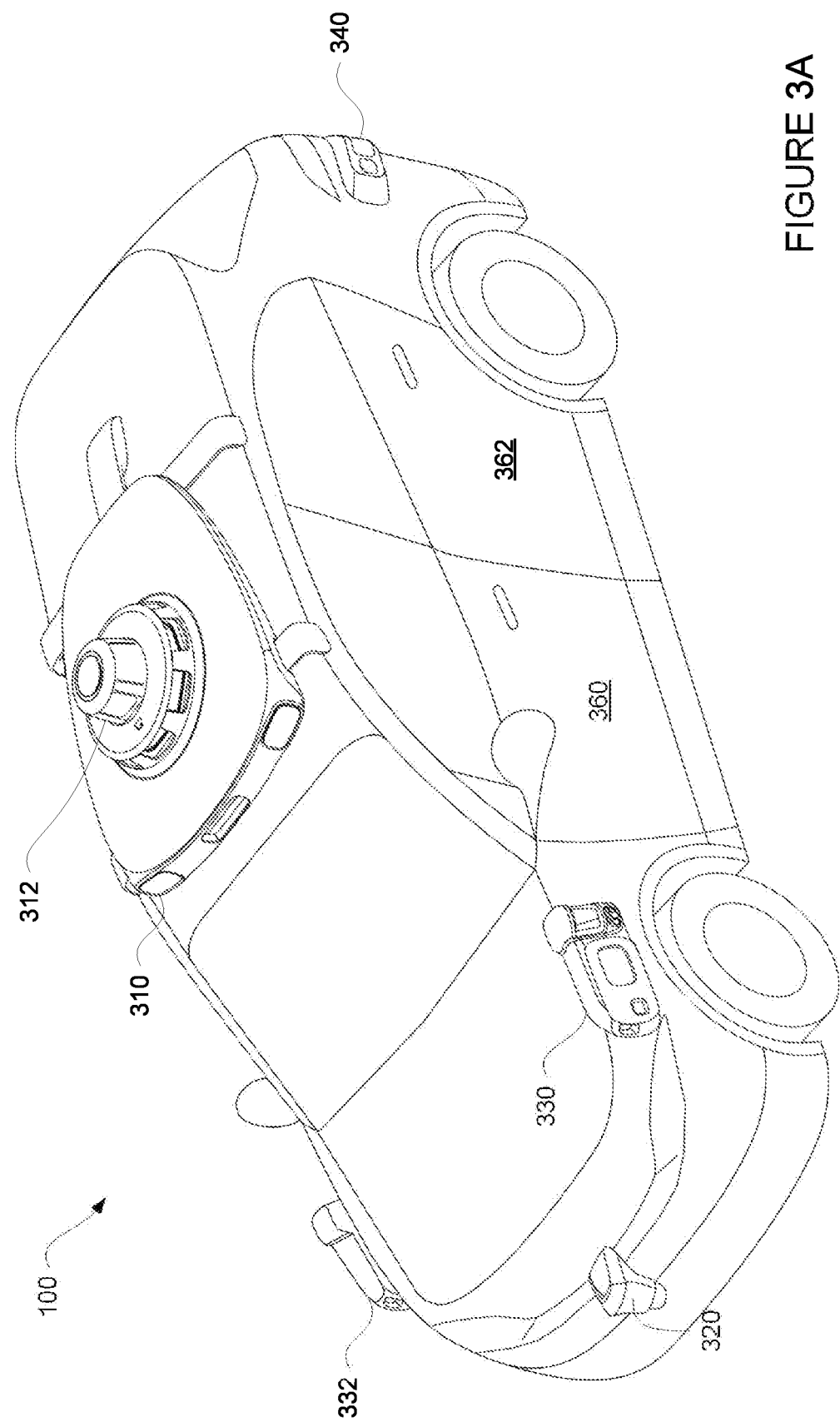
FIG. 3A-3B are example external views of a vehicle in accordance with aspects of the disclosure.
Figure 3B:
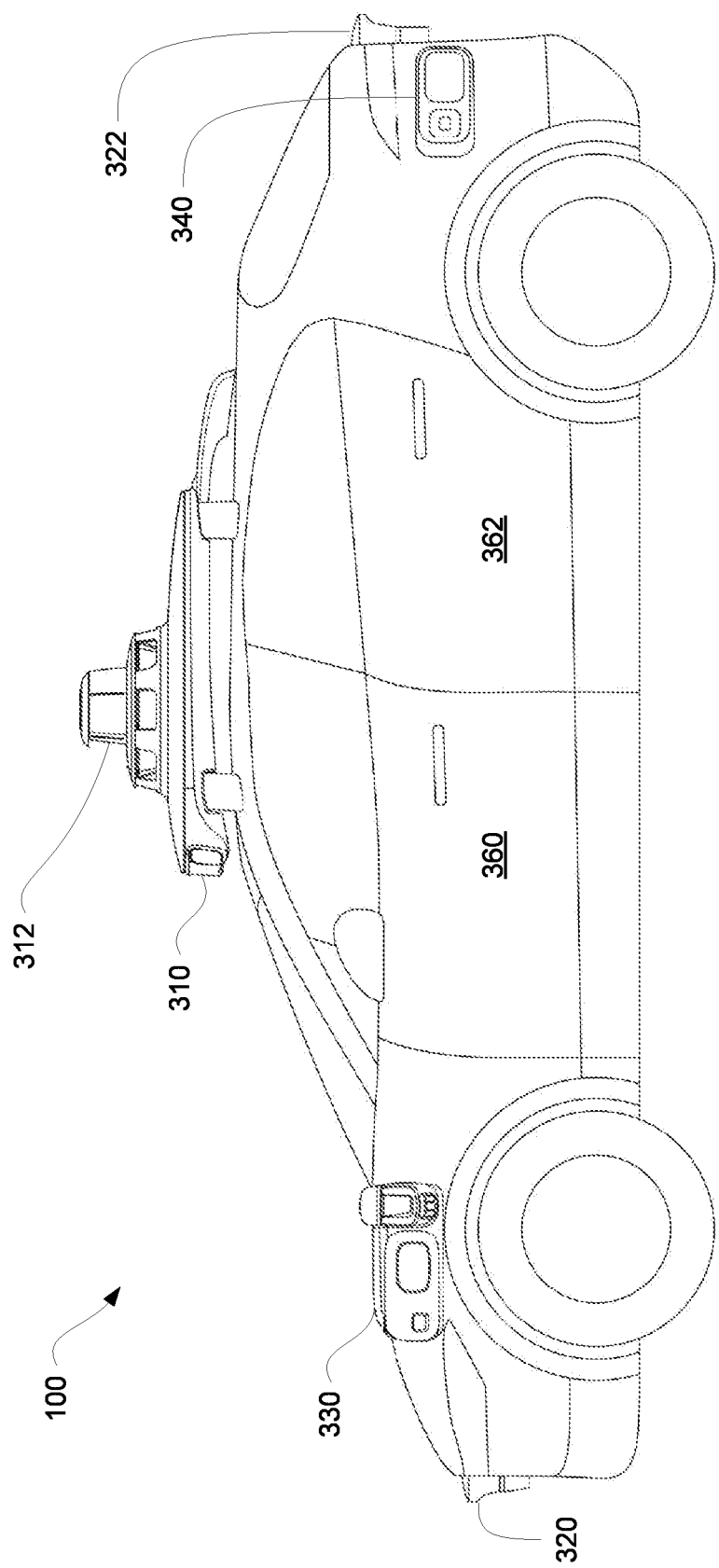

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
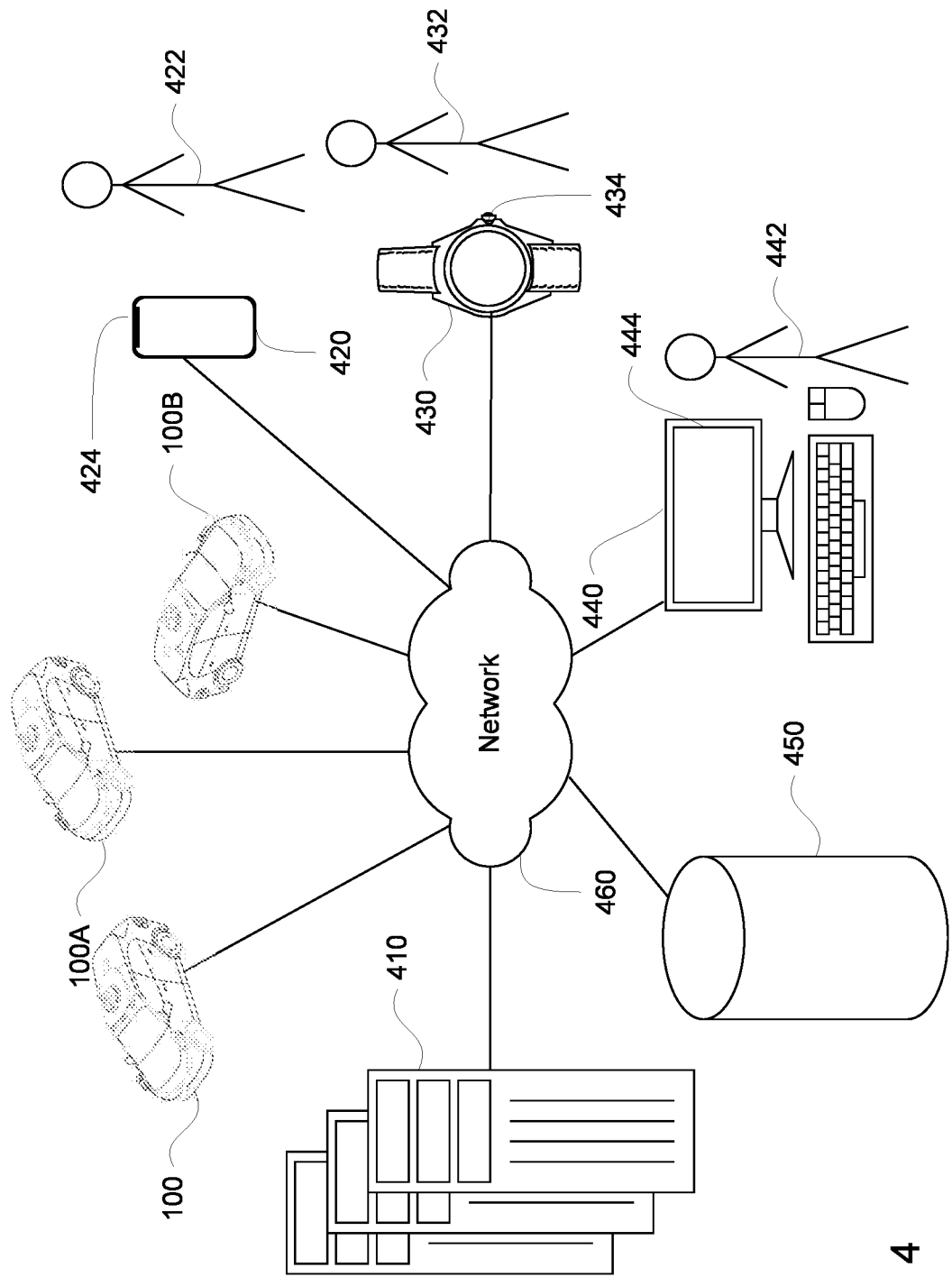
FIG. 4 is a pictorial diagram of an example system in accordance with aspects of the disclosure.
Figure 5:
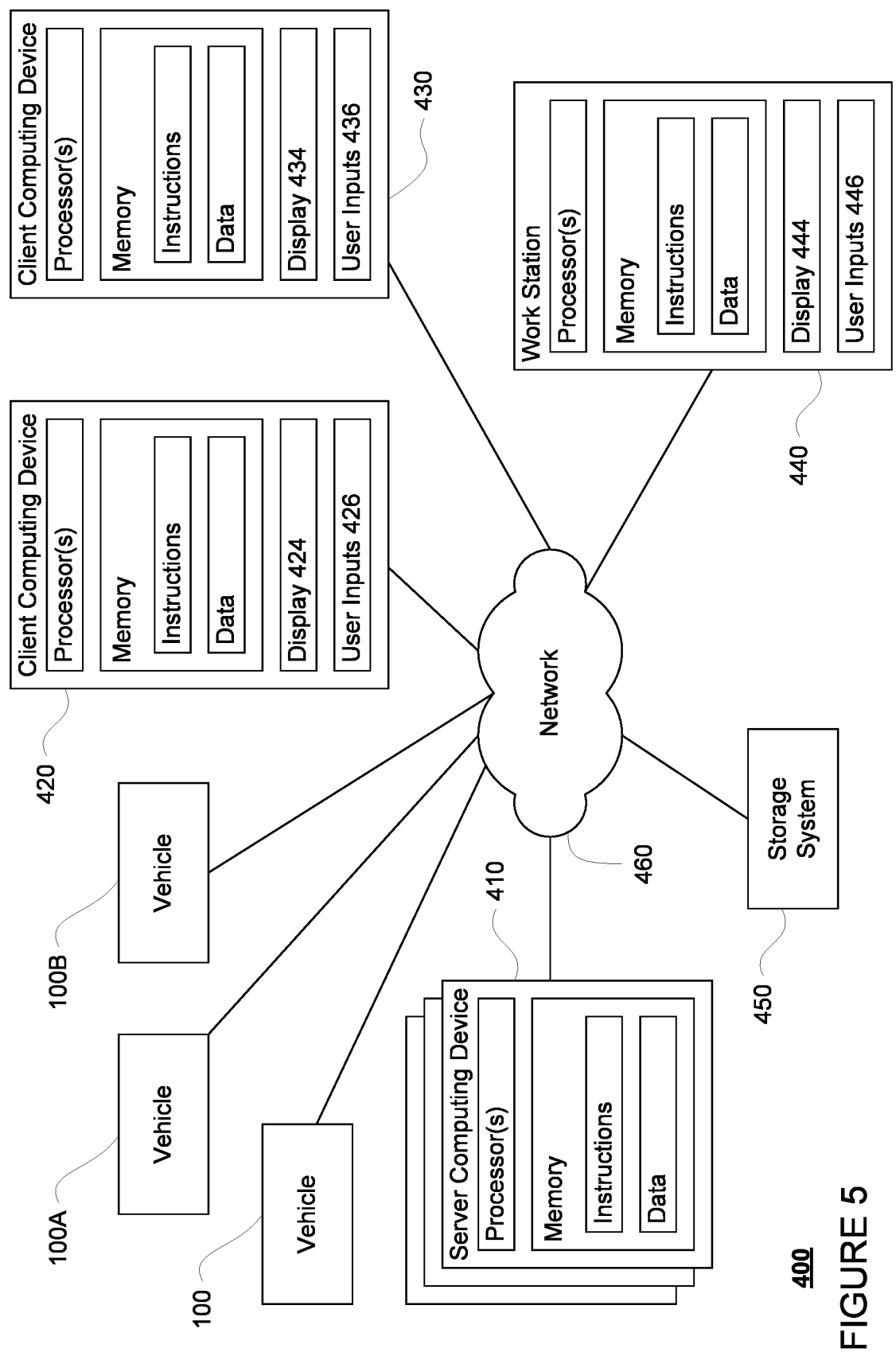
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

The server computing devices 410 may also track the status of the vehicles of the fleet using information that is periodically broadcast by the vehicles, specifically requested by the server computing devices provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose (position/location and orientation), lane information (i.e., in what lane the vehicle is currently traveling), current route, estimated time of arrival at the vehicle's current destination location (e.g. how long to reach a pickup or destination location for a passenger), as well as other information, such as whether the vehicle is currently providing transportation services, experiencing any errors or problems, etc. In this regard, the server computing devices 410 may track the vehicle's progress with regard to its current route as well as estimate when the vehicle is likely to arrive at the vehicle's current destination location. This state information may be stored, for example, in the storage system 450.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of a vehicle. In other words, user 422 may represent a passenger or a scheduler as discussed herein. In addition, client computing device 430 may represent a smart watch for a passenger of a vehicle. In other words, user 432 may represent a passenger or a scheduler as discussed herein. The client computing device 440 may represent a workstation for an operations person, for example, a remote assistance operator or someone who may provide remote assistance to a vehicle and/or a passenger. In other words, user 442 may represent an operator (e.g. operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, the storage system may store the tracked status information of the vehicles of the fleet of autonomous vehicles as discussed above as well as information about vehicles assigned to user's accounts for trips.

The storage system 450 may also store user account information. The account information may include credentials (e.g., a username and password as in the case of a traditional single-factor authentication as well as other types of credentials typically used in multi-factor authentications such as random identifiers, etc.) that can be used to identify a user and/or the user's client computing device to the one or more server computing devices. In addition, account information may also include personal information such as the user's name, contact information, identifying information of the user's client computing device (or devices if multiple devices are used with the same user account), as well as trip information (e.g. scheduled, current and past trip information).

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
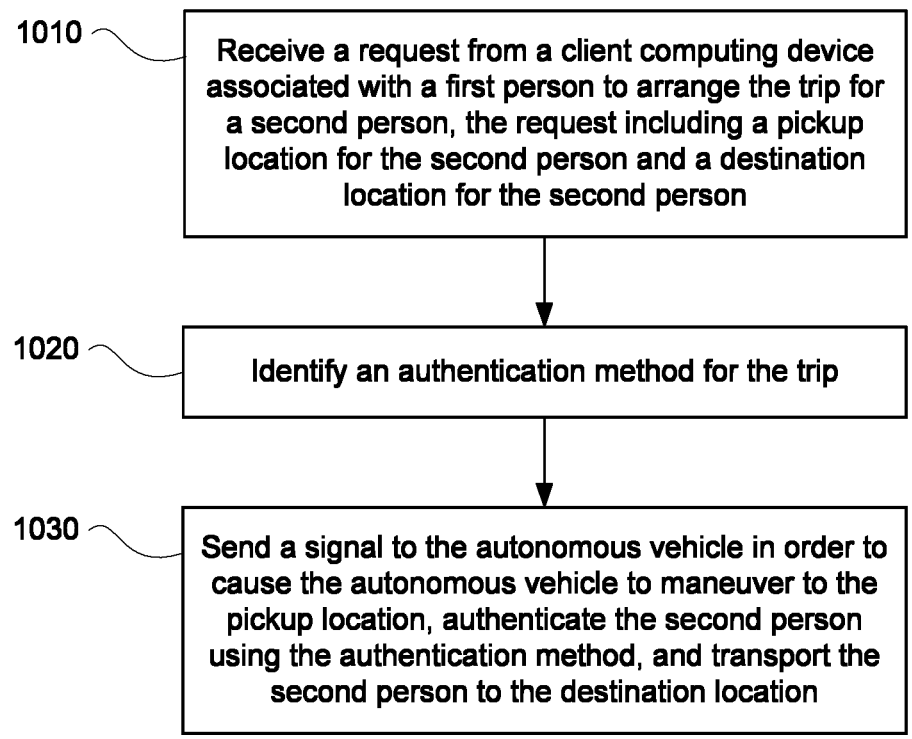
FIG. 10 is a flow diagram in accordance with aspects of the disclosure

FIG. 10 is an example flow diagram 1000 for arranging a trip in an autonomous vehicle without a driver may be performed by one or more processors, such as the one or more processors of the server computing devices 410. At block 1010, a request is received from a client computing device associated with a first person to arrange the trip for a second person. The request includes a pickup location for the second person and a destination location for the second person.

As indicated above, to enable a first person (i.e. a scheduler) to arrange a trip for a second person (i.e. a passenger), the scheduler may access an application on the scheduler's client computing device. In one aspect, a user may download an application for requesting a vehicle to a client computing device. For example, users 422 and 432 may download the application via a link in an email, directly from a website, or an application store to client computing devices 420 and 430. For example, a client computing device may transmit a request for the application over the network 460, for example, to one or more server computing devices 410, and in response, receive the application. The application may be installed locally at the client computing device 420 and/or 430.

In order to schedule a trip for another person, user 422 (hereinafter scheduler 422) may access the application on the client computing device 420. The scheduler 422 may provide both a pickup location as well as a drop off or destination location for a passenger, such as user 432 (hereinafter passenger 432). The application of the client computing device 420 may send a signal identifying the pickup and destination locations to one or more server computing devices 410. The user may enter an address or other location information, tap a location on a map or select a location from a list in order to identify a pickup location. Thus, these locations may be defined as an address, a name (e.g. a business name), a type of business (e.g. a hardware store), etc. In some instances, the user may also identify one or more intermediate destination locations in a similar manner.

This information may be sent to one or more server computing devices 410 which may arrange and schedule the trip by selecting and assigning an autonomous vehicle to the trip. In some instances, in response to receiving the pickup location, destination location and any intermediate destination locations, the server computing devices 410, may request the user to confirm the trip (e.g. confirm the details of the trip). Once confirmation is received from the client computing device 420, the server computing devices 410 may assign and dispatch an autonomous vehicle, such as autonomous vehicle 100, to pick up the user 422 and complete the trip. To do so, the server computing devices 410 may first select an autonomous vehicle, for instance based on proximity to the pickup location and/or availability, and assign the autonomous vehicle to the user for the trip. For example, the server computing devices 410 may determine that the autonomous vehicle 100 is available and closest to the location of the passenger (user 432).

In addition, the scheduler's client computing device may also be associated with the trip so that the server computing devices are able to communicate additional information about the trip to the scheduler's client computing device as discussed further below. For instance, this association may be stored in the storage system 450, for instance with the scheduler 422's account information, and accessed as needed. In this regard, scheduling a trip for a passenger may generally follow a process similar to typical trip scheduling processes.

Returning to FIG. 10 at block 1020, an authentication method for the trip is identified. The server computing devices 410 may identify an authentication method in various ways. In this regard, in order to facilitate the aforementioned authentication, different authentication processes may be used. For instance, the authentication process may include a passcode authentication method that involves the server computing devices 410 providing the scheduler's client computing device 420 with a passcode (e.g. a QR code, passphrase, or alphanumeric code). Another authentication process may include a link authentication method that involves the server computing devices 410 providing the scheduler's client computing device 420 with a link to a website (discussed further below) which the scheduler 422 may then forward to the passenger 432. Alternatively, the authentication process may involve providing other information to the scheduler 422 which the scheduler 422 may then forward to the passenger 432. For instance, the scheduler 422 may provide the information to passenger 432 via email, text message, phone call or other communication method. This information may then also be provided to the assigned autonomous vehicle, for example to autonomous vehicle 100 via the network 460.

Another authentication process may include an image or video authentication method. In some instances, as discussed further below, an image or video of the passenger may be provided to the user's client computing device for authentication. In some instances, the server computing devices 410 may automatically identify, provide or enable a default authentication method. For instance, the default authentication method may not require the scheduler to provide any information about the passenger to the server computing devices via the application to facilitate the authentication of the passenger. In addition, the default authentication method may not require that the scheduler 422 provide information received from the server computing devices 410 to the passenger 432 to facilitate the authentication of the passenger. By doing so, this may enable the autonomous vehicle to authenticate the passenger even though the passenger 432 may not necessarily have a client computing device (e.g. a cell phone), the aforementioned application or an account with the transportation service.

In some instances this default authentication method may be saved from a last trip scheduled for another person by the scheduler 422 (e.g. stored with the scheduler's account information in the storage system 450) or may be automatically selected based on information provided by the scheduler. For instance, the scheduler 422 may indicate that the trip is for a passenger who will not be using a cell phone (or other client computing device) or who will be using a cell phone (or other client computing device). As another instance, the server computing devices 410 may select the default authentication method based on a type of the pickup location. For example, if the pickup location corresponds to a school or airport which may be crowded, the server computing devices 410 may automatically select an authentication method that requires the scheduler to confirm that the passenger is correct as in the examples described below where an image or video is captured after a person (e.g. the passenger) has consented. The information about the types of different locations may be included in the map information used by the server computing devices 410 and/or the autonomous vehicle 100.

Figure 6:
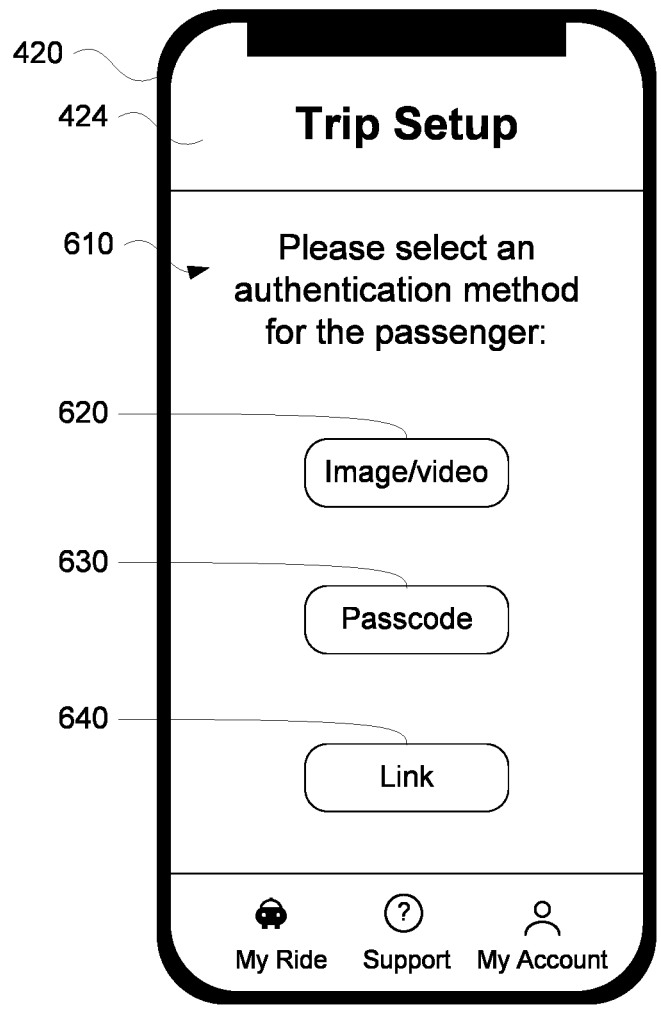
FIG. 6 is an example client device, displayed notification, and list of authentication methods in accordance with aspects of the disclosure.

In some instances, the scheduler 422 may then be able to change the default authentication method to a different authentication method which may be appropriate for the situation. For instance, the server computing devices 410 may send a list of authentication methods for display to the client computing device 420. FIG. 6 provides an example of a client computing device 420 displaying a notification 610 on display 424. The notification 710 includes a request that the scheduler 422 identify an authentication method from a list of authentication methods. In this example, the list includes an option 620 to select an image or video authentication method (which, as discussed further below, may require the consent of the passenger), an option 630 to select a passcode authentication method, and an option 640 to include a link authentication method. Further examples of such methods are described above and below. Of course fewer or more or different authentication methods may be displayed on the display to the scheduler. The scheduler 422 may select from the displayed list of authentication methods, for instance, by tapping on the desired option.

Once the authentication method is identified or selected, a signal may be sent to the server computing devices 410 from the client computing device 420 in order to enable the selected authentication method. In some examples, the server computing devices 410 may generate and send authentication information to the scheduler (e.g. the passcode, link, etc.), or for example, directly to a client computing device of the passenger 432, such as the client computing device 430, (e.g. via text message or email if provided). If the server computing devices 410 sends the authentication information (e.g. passenger authentication information) to the client computing device 420 of the scheduler 422, the scheduler 422 may forward the passenger authentication information to a client computing device of the passenger (e.g. via text message or email). In addition, the server computing devices may associate and store the passenger authentication information with the scheduler 422's account information in the storage system for later access as needed.

Returning to FIG. 10, at block 1030, a signal is sent to the autonomous vehicle in order to cause the autonomous vehicle to maneuver to the pickup location, authenticate the second person using the authentication method, and transport the second person to the destination location. As noted above, the server computing devices 410 may dispatch the autonomous vehicle 100 once it is assigned to the trip for the passenger 432. This may include providing information identifying the pickup location, the destination location and any intermediate destination locations. In addition, the server computing devices 410 may also send information to the autonomous vehicle 100 indicating what type of authentication method will be used when picking up the passenger 432, and if needed, passenger authentication information if the authentication process is to occur at the autonomous vehicle. Alternatively, no passenger authentication information need be sent to the autonomous vehicle if the authentication process is to occur remote from the autonomous vehicle.

Once the autonomous vehicle 100 is assigned to the trip, the autonomous vehicle may control itself to the pickup location in order to authenticate and pick up the passenger 432. In some instances, the autonomous vehicle may display information on an external display of the autonomous vehicle to assist a person in locating the autonomous vehicle, such as the name or initials of the assigned passenger, the name or initials of the scheduler, a destination location of the passenger, or other information.

The authentication method may involve authenticating a person approaching or within the autonomous vehicle 100, once the autonomous vehicle is stopped and waiting for the passenger 432. In some instances, the authentication method may involve capturing an image or video of the passenger. In order to do so, the passenger may first need to provide consent for the autonomous vehicle to capture an image or video of the passenger. This may occur in any number of ways. For instance, when the scheduler arranges a trip for the passenger, the application may allow the scheduler to send a text message to a client computing device of the passenger with details about the passenger's trip (e.g. time, location of pickup, etc.). This text message or messages may also provide a request for consent to capture an image or video of the passenger and share this image or video with the scheduler. The passenger may then provide consent by simply responding to the text message (e.g. by texting "y" or "yes"). As an alternative, when the scheduler arranges a trip for the passenger, the application may automatically initiate a call to a client computing device (e.g. a cell phone) of the passenger. The call may include providing an audio message (e.g. a recording or other audio clip) indicating that a trip has been scheduled for the passenger and requesting the passenger's consent to capture an image or video of the passenger and share this image or video with the scheduler. An example audio message may include: "Your autonomous vehicle will arrive in 10 min at 9:32 am in front of 123 Main Street. To ensure we only unlock the doors for you, we can use the car sensors to take your photograph, share this photograph with the scheduler, and allow the scheduler to confirm it's you before unlocking your vehicle. Do you consent to your autonomous vehicle taking and using your photo in this way before it unlocks? Please respond by speaking yes or no." Of course other types of audible messages may be used.

In still other examples, consent may be obtained at the autonomous vehicle. For instance, the autonomous vehicle's computing devices 110 may display a notification on an external display of the autonomous vehicle (e.g. a display located on the upper housing 312) and/or provide an audible request via an external speaker of the autonomous vehicle requesting a person's consent to capture an image or video of a person or pedestrian outside of the vehicle, for instance using a camera of the perception system 174. The person may then use the display (e.g. a touch screen), microphone or another user input device on the exterior of the autonomous vehicle to indicate consent (e.g. by selecting an option to confirm the person's consent). As an alternative, once the autonomous vehicle 100 is stopped and waiting for the passenger 432, the autonomous vehicle may unlock its doors, allow a person to open a door and enter the autonomous vehicle and close the door. If consent has not already been received, the autonomous vehicle's computing devices 110 may display a notification, for instance on display 152, and/or provide an audible request via an external speaker of the autonomous vehicle requesting the passenger's consent to capture an image or video and share this image or video with the scheduler. As an alternative to displaying an explicit request (e.g. text requesting the user to provide consent), the notification (displayed internally or externally on a display or provided on a sticker or other decal on the outside of the autonomous vehicle) may include a QR code for the passenger to scan in order to access an online consent form. The online consent form may enable the passenger to provide consent to capture the image or video of the passenger. In some instances, when utilizing an external display, the notification may be displayed automatically in response to the person pulling on a door handle of a door of the autonomous vehicle.

Once the consent has been received, the computing devices 110 may capture an image or video of the person or a photo identification (e.g. driver's license, passport, or other identification materials of the passenger) using a camera of the autonomous vehicle's perception system or using an internal (e.g. internal-facing or physically internal) camera of the autonomous vehicle. In some instances, the images or video may be captured in response to the person taking a specific action. For example, the person may be required to press a button, send a text message or make a phone call, pull on a door handle, speak a command, etc. This may also involve the computing devices 110 displaying or providing an audible message to the person. This may include a welcome message such as "Hi and welcome! Please get comfortable and buckle up. Before we start your ride, we need to confirm it's you, so we'll use the interior cameras to check. Please look straight ahead as we capture an image for the scheduler to confirm it's you." In this regard, even after consent has been obtained, the autonomous vehicle's computing devices 110 may provide the person with information indicating that an image or video is being captured in order to facilitate authentication.

The captured image or video may be forwarded to the scheduler 422's client computing device 420 for display. At this point, the scheduler may confirm whether or not the person is the passenger 432. If so, the server computing devices may send a signal to the autonomous vehicle to cause the autonomous vehicle to automatically proceed to the destination location. In such examples, once the person has been authenticated, the computing devices 110 may display or provide a further notification an audible message to the person. This may include a message such as "It's you all right! Are you ready to go?" and other such messages.

Figure 7:
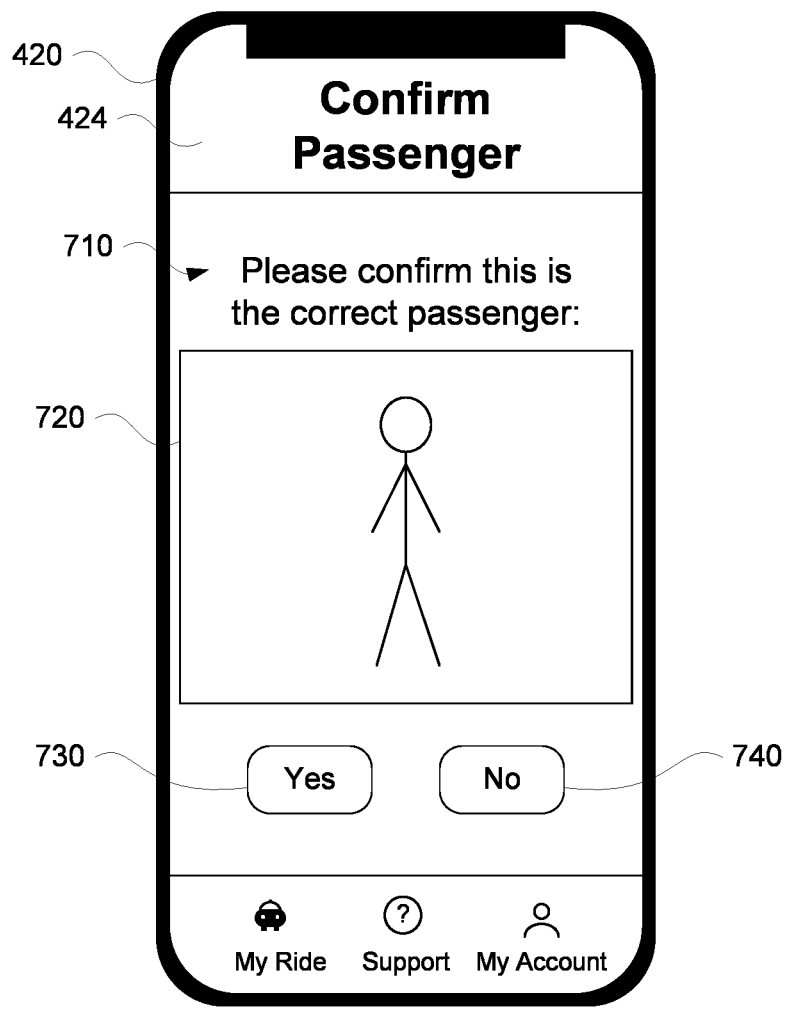
FIG. 7 is an example client device, displayed notification, and image or video in accordance with aspects of the disclosure.

FIG. 7 provides an example of the client computing device 420 displaying a notification 710 on display 424. The notification 710 requests that the scheduler 422 confirm the identity of a person included in a displayed image or video 720. At this point, the scheduler 422 may confirm whether or not the person is the passenger 432, for instance by tapping on one of option 730 ("yes") or option 740 ("no"). If yes, and the autonomous vehicle has not already unlocked its doors to allow the passenger to enter, the server computing devices may send a signal to the autonomous vehicle 100 to unlock the doors of the autonomous vehicle and allow the person (passenger 432) to open a door (e.g. door 360, door 362, or another door) and enter the autonomous vehicle. Once inside, the passenger 432 may close the door, and the autonomous vehicle may automatically proceed to the destination location. In addition, in other instances, if the person is not already in the autonomous vehicle, the autonomous vehicle may unlock its doors in order to allow the person to enter the vehicle and wait for consent and/or confirmation that the person is the passenger before the autonomous vehicle departs. In this regard, the person may have a more comfortable and potentially safer place to wait while seeking confirmation.

If the scheduler does not confirm (e.g. selects option 740), the autonomous vehicle may remain locked. In addition, the server computing devices may send a signal to the autonomous vehicle 100 in order to cause the computing devices 110 to provide a notification to the person indicating that the person has not been authenticated. For example, the notification may include visual feedback via lights or displays such as red lights near the door, "not authorized passenger" messaging, locked icon, etc. In addition or alternatively, the notification may include audio feedback via speakers of the autonomous vehicle, such as by playing an error sound, "car locked" or "not authorized passenger" messages, etc. In addition, as noted above, in instances where the person is not initially confirmed as the passenger and is not already in the autonomous vehicle, the autonomous vehicle may unlock its doors in order to allow the person to enter the vehicle and wait for confirmation that the person is the passenger before the autonomous vehicle departs. Again, in this regard, the person may have a more comfortable and potentially safer place to wait while seeking confirmation.

In some instances, if the person is a user of the application, but simply not the correct passenger for the trip (e.g. authentication between the autonomous vehicle and the user's client computing device failed), the user may receive similar notifications on the user's client computing device from the server computing devices 410. This may be especially helpful if the user simply tried to or did enter the wrong vehicle.

As another alternative, the passenger 432 may need to provide the passenger authentication information (e.g. a passcode) generated by the server computing devices 410 to the autonomous vehicle. For example, the passenger 432 may need to enter an alphanumeric code or speak a passphrase (e.g. into a microphone of the perception system 174) at a door of the autonomous vehicle in order to unlock the door, enter an alphanumeric code via a user input of the user inputs 150 positioned at a door of the autonomous vehicle, or speak a passphrase into user input 150 of the autonomous vehicle once inside in order to begin the trip. The received or recorded passcode (e.g. audio recording) may be compared to passenger authentication information received by the autonomous vehicle from the server computing devices 410 in order to authenticate the person or passenger. Alternatively, the received or recorded passcode may be sent to the server computing devices for comparison and authentication locally at the server computing devices 410 using the passenger authentication information associated with the scheduler 422's account information and stored in the storage system 450.

In some instances, the passcode may include a QR code or other visual information which the passenger 432 can display on a client computing device, such as client computing device 430, and orient towards a camera of the perception system 174 of the autonomous vehicle 100. In this regard, different welcome messages may also be provided depending upon the circumstances of the authentication method. For example, if the authentication method includes the person displaying a QR code, a welcome message may include "Hi and welcome! Please get comfortable and buckle up. Before we start your ride, we need to confirm it's you, so we'll use the interior cameras to check for the QR code that the scheduler sent you via a text message or email. Open that QR code from your messages, and hold up your phone with that image full screen so we can take a picture of the QR code." In this regard, the autonomous vehicle's computing devices 110 may provide the person with information indicating that an image or video is being captured in order to facilitate authentication. The person may then display the QR code which may be automatically scanned or captured in response to the person taking a specific action (e.g. speaking a verbal command such as "ready").

The autonomous vehicle's computing devices 110 may thus capture an image of the passcode (e.g. QR code as opposed to the person) and process the image to identify instructions. The instructions may cause the autonomous vehicle to automatically unlock the doors of the autonomous vehicle or cause the autonomous vehicle to automatically proceed to the destination location as in the examples described above. Alternatively, the instructions may cause the autonomous vehicle to send a signal with the information from the QR code to the server computing devices 410 which, in turn, confirm that the information matches the passenger authentication information associated with the scheduler's 422's account information in the storage system 450. If so, the person is authenticated, the server computing devices 410 may send a signal to the autonomous vehicle 100 (e.g. via the network) to unlock the doors of the autonomous vehicle or to cause the autonomous vehicle to automatically proceed to the destination location as in the examples described above. Again, in such examples, once the person has been authenticated, the computing devices 110 may display or provide a further notification an audible message to the person. This may include a message such as "It's you all right! Are you ready to go?" and other such messages.

As another alternative, if the passcode includes a link, a passenger 432 may use the link to access a secure website or a lightweight application streamed via a uniform resource locator (URL). The website or application may include an option to automatically unlock the doors of the autonomous vehicle 100, for instance, by causing the server computing devices 410 to send a signal to the autonomous vehicle (e.g. via the network 460) to unlock the doors of the autonomous vehicle. The website or application may alternatively display a passcode which the person or passenger can enter or display and orient towards a camera of the autonomous vehicle as in the examples above. In some instances, the web site or application may include an option to cause the server computing devices to send a signal to the autonomous vehicle 100 to generate a sound (e.g. horn honk) to assist the person in locating the autonomous vehicle.

In some instances, if the passenger cannot be authenticated, for example after some maximum number of attempts, the trip may be canceled. In this regard, passengers may be no longer eligible to take a trip, and if already in the autonomous vehicle, must disembark. In some instances, a remote assistance operator, such as described above, may be automatically connected with the autonomous vehicle in order to communicate with the passenger and/or resolve any authentication issues.

During the trip, the passenger 321 may be provided with additional features or functionalities. This may be facilitated by sending additional instructions from the server computing devices 410 to the autonomous vehicle 100 at the time the pickup location, destination location, and authentication method are sent to the autonomous vehicle. For instance, when the passenger 432 enters the autonomous vehicle 100, autonomous vehicle's computing devices 110 may display a notification, for instance on display 152, requesting the passenger's consent to facilitate a communication link with the scheduler. Once consent is received, the computing devices 110 may send a signal to the server computing devices 410 which may then facilitate a communication link, such as a VOIP call or a video conferencing link, between the autonomous vehicle and the scheduler 422's client computing device 420. This may allow the passenger 432 to speak with the scheduler 422 during the trip. In some instances, the passenger may be provided with an option to decline or disable communications with the scheduler or to simply cover any camera (e.g. for privacy) within the vehicle with a privacy cover. In this regard, an additional interior camera may be placed in a convenient location, such as a rear-view mirror area of a headliner of the autonomous vehicle 100 for this purpose.

Figure 8:
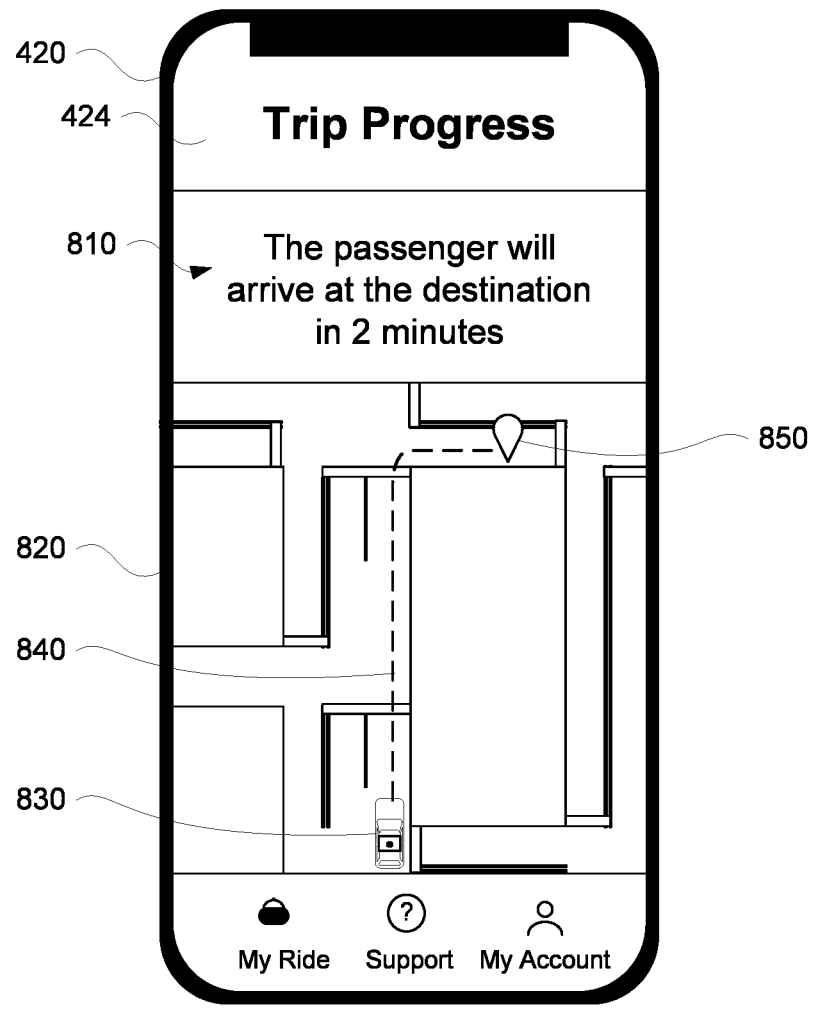
FIG. 8 is an example client device, a map, and location information in accordance with aspects of the disclosure.

In addition, as the server computing devices 410 receive updated status information about the location and status of the autonomous vehicle as described above, this information may also be sent to the scheduler 422's client computing device 420 if passenger 432 has consented to sharing their location. FIG. 8 provides an example of client computing device 420 displaying a notification 810 on display 424. The notification 810 provides information indicating the passenger 432's estimated time of arrival at a destination location. In addition, the display 424 includes a map 820 which may be generated based on the map information 200. The map identifies the location of the autonomous vehicle 100 represented by displayed representation 830 as well as a representation 840 of a route being followed by the autonomous vehicle 100 towards the destination location of the passenger, represented by marker 850. In this regard, the scheduler 422 may be able to use the application to view the passenger's progress towards the destination location during the trip on the client computing device 430. In addition, if there is some problem with the autonomous vehicle 100 or the trip, such as heavy traffic congestion or a collision, stoppage, delay or other trip interruption, the server computing devices 410 may report this information to the scheduler's client computing device automatically via the application. Additionally, if the passenger selects "pull over" button or option in the vehicle, the scheduler could be notified by the server computing devices 410 via the application on the scheduler's client computing, device if the passenger has consented to sending the notification. Similarly, if the autonomous vehicle's route and/or estimated time of arrival change, such changes could also trigger notifications to the scheduler from the server computing devices 410 if the passenger has consented.

In some instances, the scheduler may also customize certain features of the trip. For example, when setting up a trip, the scheduler may select or define wayfinding features for the passenger, for instance that the autonomous vehicle will play a special sound for the passenger to help the passenger find the autonomous vehicle), input the name of the passenger so that the autonomous vehicle can provide audible or visual notifications to greet the passenger as the passenger enters the autonomous vehicle, default screen views for the passenger during the trip (e.g. two-dimensional map, three-dimensional scene, etc.), music or other media to be played during the trip and available media controls for the passenger during the trip, available trip options (e.g. whether the passenger is able to add, remove, and/or change intermediate destinations or final destinations).

In some instances, the destination location may be a fixed location or may be fixed to the scheduler 422's location, or rather, the location of the scheduler's client computing device 430. In other words, when setting up the trip, the scheduler may select an option to request that the trip "send the passenger to me". In this regard, the scheduler 422's client computing device 420 may periodically communicate location information for the scheduler 422's client computing device 420 to the server computing 410 devices via the application. The server computing devices 410 may forward this information to the autonomous vehicle 100 as the information is received or if the scheduler's location changes at least some minimum distance in order to prevent the autonomous vehicle from rerouting due to changes in location that may be due to GPS accuracy, etc. For instance, this distance may be a fixed measurement (e.g. 100 meters or more or less) or may be based on the user's location (e.g. 1 city block, etc.). In this regard, the autonomous vehicle's routing system 170 may periodically automatically reroute the autonomous vehicle to a new destination location in order to bring the passenger 432 to the location of the scheduler 422's client computing device 420.

Once the autonomous vehicle 100 has reached the passenger 432's destination location, it may pull over and stop to allow the passenger to exit the autonomous vehicle. In some instances, autonomous vehicle's computing devices 110 may display a notification, for instance on display 152, requesting the passenger's consent to capture and send an image or video of the passenger at the destination. Once consent is received, the computing devices 110 may capture an image or video of the passenger and send the image or video to the server computing devices 430. The image or video may be captured after a door of the autonomous vehicle has been opened or closed. The image or video may also be captured a few seconds after the door has been closed in order to increase the likelihood of the image or video capturing the passenger (now person) reaching a final destination location.

Figure 9:
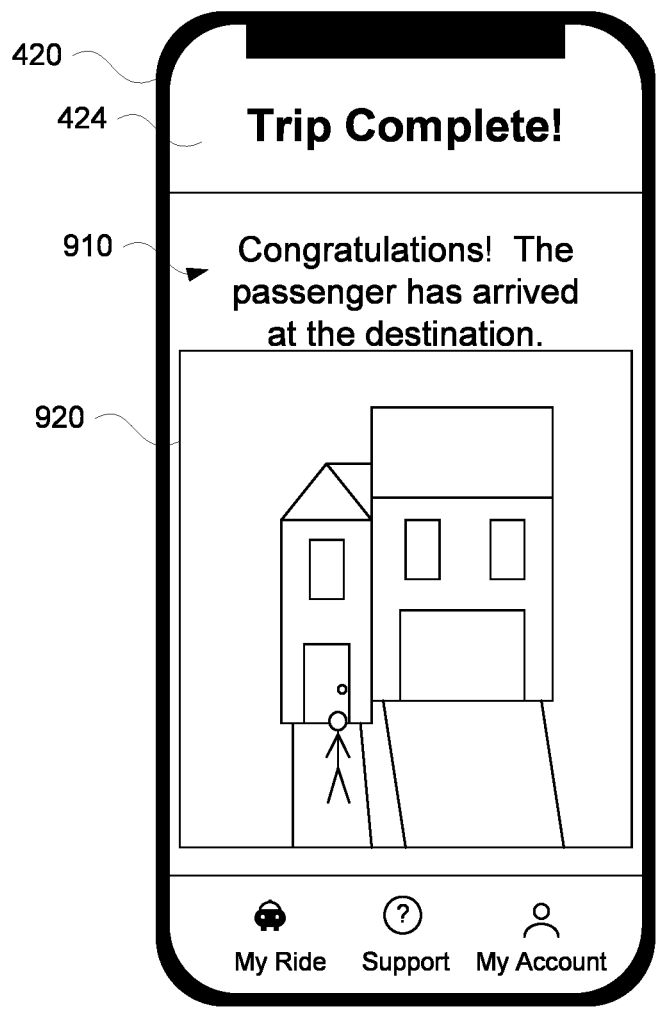
FIG. 9 is an example client device, displayed notification, and image or video in accordance with aspects of the disclosure.

The server computing devices 410 may again provide the scheduler 422's client computing device 430 with the image or video via the application in order to indicate to the scheduler that the person has reached the final destination location. FIG. 9 provides an example of client computing device 420 displaying a notification 910 on display 424. The notification 910 provides information indicating the passenger 432 has reached the destination as well as a displayed image or video 920 of the passenger 432 after exiting the autonomous vehicle 100.

In this regard, this length of time may be selected or determined based on the type of the destination location. For example, a longer period of time may be used when the destination location is a school or shopping area, and a shorter prior of time may be used when the location is a residential home.

The features described herein may allow users (e.g. schedulers) of a transportation service to arrange trips for another person (e.g. passengers) utilizing autonomous vehicles which may not have a driver. This may be especially useful for scheduling trips for persons who may not have access to a phone (or other client computing device), may not be considered "tech savvy", or may not otherwise be comfortable or readily capable of arranging a trip themselves. The features described herein may provide for authenticating of passengers when they arrive at the autonomous vehicle to ensure that such passengers are the passenger assigned to the vehicle, in the correct vehicle and/or are going to be traveling to the correct destination location. In addition, the features described herein may help to ensure such passengers have a comfortable and safe trip in an autonomous vehicle during a trip.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of arranging a trip in an autonomous vehicle without a driver, the method comprising:
    receiving, by one or more processors, a request from a client computing device associated with a first person to arrange the trip for a second person, the request including a pickup location for the second person and a destination location for the second person;
    receiving, by the one or more processors from the client computing device, information identifying an authentication procedure selected from a list of optional authentication procedures that can be performed; and
    in response to receiving the information identifying the selected authentication procedure, sending, by the one or more processors, a first signal to the autonomous vehicle in order to cause the autonomous vehicle to maneuver to the pickup location, authenticate the second person using the selected authentication procedure, and transport the second person to the destination location.

2. The method of claim 1, further comprising:
    providing the client computing device with first authentication information;
    receiving second authentication information from the autonomous vehicle; and
    authenticating the second person using the first authentication information and the second authentication information.

3. The method of claim 2, further comprising, based on the authenticating, sending a second signal to the autonomous vehicle to cause the autonomous vehicle to unlock a door of the autonomous vehicle.

4. The method of claim 2, further comprising, based on the authenticating, sending a second signal to the autonomous vehicle to cause the autonomous vehicle to transport a passenger to the destination location.

5. The method of claim 2, wherein the first authentication information includes a QR code.

6. The method of claim 5, wherein the second authentication information includes an image.

7. The method of claim 2, wherein the first authentication information includes a passphrase.

8. The method of claim 7, wherein the second authentication information includes an audio recording of the passphrase.

9. The method of claim 1, further comprising
    receiving from the autonomous vehicle an image or video;
    sending the image or video to the client computing device;
    in response to sending the image or video to the client computing device, receiving a second signal indicating that the image or video includes the second person; and
    in response to receiving the second signal, sending a third signal to the autonomous vehicle to cause the autonomous vehicle to unlock a door of the autonomous vehicle.

10. The method of claim 1, further comprising
    receiving from the autonomous vehicle an image or video;
    sending the image or video to the client computing device;
    in response to sending the image or video to the client computing device, receiving a second signal indicating that the image or video includes the second person; and
    in response to receiving the second signal, sending a third signal to the autonomous vehicle to cause the autonomous vehicle to transport a passenger to the destination location.

11. The method of claim 1, wherein the identified authentication procedure is selected based on a type of the pickup location.

12. The method of claim 1, wherein the identified authentication procedure is selected by the first person when scheduling the trip for the second person.

13. The method of claim 1, further comprising:
    receiving a second signal from the client computing device indicating that the second person will not be authenticating using a cell phone.

14. The method of claim 1, wherein the list of optional authentication procedures includes an image or video authentication procedure to authenticate the second person.

15. The method of claim 1, further comprising sending a link to the client computing device, wherein the link corresponds to a secure website which includes an option for unlocking the autonomous vehicle.

16. The method of claim 1, further comprising, sending a second signal to the autonomous vehicle to cause the autonomous vehicle to limit changes to the destination location during the trip.

17. The method of claim 1, further comprising, facilitating a communication link between the autonomous vehicle and the client computing device in order to enable the first person to communicate with the second person during the trip.

18. The method of claim 1, wherein the destination location corresponds to a current location of the client computing device, and the method further comprises:
    receiving an updated location of the client computing device after the second person has been authenticated; and
    providing the autonomous vehicle with updated location such that the autonomous vehicle reroutes itself in order to drop off the second person at the updated location.

19. The method of claim 1, further comprising:
    receiving an image or video after the second person has exited the autonomous vehicle; and
    providing the image or video to the client computing device for display to the first person.

20. A system for arranging a trip in an autonomous vehicle without a driver, the system comprising one or more server computing devices having one or more processors configured to:
    receive a request from a client computing device associated with a first person to arrange the trip for a second person, the request including a pickup location for the second person and a destination location for the second person;

receive, from the client computing device, information identifying an authentication procedure selected from a list of optional authentication procedures that can be performed; and in response to receiving the information identifying the selected authentication procedure, send a signal to the autonomous vehicle in order to cause the autonomous vehicle to maneuver to the pickup location, authenticate the second person using the selected authentication procedure, and transport the second person to the destination location.

21. The system of claim 20, wherein the one or more processors are further configured to send the list of optional authentication procedures to the client computing device.

22. The method of claim 1, further comprising:
sending, by the one or more processors to the client computing device, the list of optional authentication procedures.

23. The method of claim 1, wherein the list of optional authentication procedures includes a link authentication procedure to authenticate the second person.

24. The system of claim 20, wherein the list of optional authentication procedures includes an image or video authentication procedure to authenticate the second person.

25. The system of claim 20, wherein the list of optional authentication procedures includes a link authentication procedure to authenticate the second person.

\* \* \* \* \*